(12) United States Patent
Wang et al.

(10) Patent No.: US 12,547,422 B2
(45) Date of Patent: Feb. 10, 2026

(54) APPLICATION REMODELING METHOD, SYSTEM, CLUSTER, MEDIUM, AND PROGRAM PRODUCT

(71) Applicant: Huawei Cloud Computing Technologies Co., Ltd., Guizhou (CN)

(72) Inventors: Xinyu Wang, Chengdu (CN); Kun Wu, Chengdu (CN); Hong Wang, Chengdu (CN); Shuangchun Liu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 21 days.

(21) Appl. No.: 18/464,250

(22) Filed: Sep. 10, 2023

(65) Prior Publication Data

US 2023/0418623 A1    Dec. 28, 2023

Related U.S. Application Data

(63) Continuation of application No. PCT/CN2021/137543, filed on Dec. 13, 2021.

(30) Foreign Application Priority Data

Mar. 23, 2021  (CN) .......................... 202110307720.2
Jul. 28, 2021   (CN) .......................... 202110859637.6

(51) Int. Cl.
  *G06F 9/445*    (2018.01)
  *G06F 8/41*     (2018.01)
  *G06F 8/61*     (2018.01)

(52) U.S. Cl.
  CPC .......... *G06F 9/44505* (2013.01); *G06F 8/433* (2013.01); *G06F 8/63* (2013.01)

(58) Field of Classification Search
  CPC ...... G06F 9/445; G06F 9/44505; G06F 8/433; G06F 9/45558; G06F 8/63
  See application file for complete search history.

(56) References Cited

U.S. PATENT DOCUMENTS

| | | | |
|---|---|---|---|
| 11,379,320 B2 * | 7/2022 | Xiao | G06F 8/65 |
| 2016/0330277 A1 | 11/2016 | Jain et al. | |
| 2016/0350105 A1 * | 12/2016 | Kumar | G06F 8/74 |
| 2020/0272427 A1 | 8/2020 | Wang et al. | |
| 2022/0066765 A1 * | 3/2022 | Lavoie | G06F 8/63 |
| 2022/0245000 A1 * | 8/2022 | Kalia | G06N 5/022 |
| 2023/0044016 A1 * | 2/2023 | Harper | G06F 8/65 |

FOREIGN PATENT DOCUMENTS

| | | |
|---|---|---|
| CN | 108279892 A | 7/2018 |
| CN | 111338641 A | 6/2020 |

* cited by examiner

*Primary Examiner* — Marina Lee (57) ABSTRACT

In an application remodeling method, an application management system obtains an environment variable of an application in a runtime environment and a code package of the application. The system then obtains a remodeling result of the application based on the environment variable and the code package. The remodeling result includes an image set of the application, the image set includes a plurality of images, and a container created based on each image is configured to execute some modules of the application. Thus, automatic application remodeling is implemented based on the environment variable and the code package of the application.

20 Claims, 5 Drawing Sheets

FIG. 1

| < | Select a to-be-remodeled application | | |
|---|---|---|---|
| Source code package name | Applicable system | Version | |
| asdxxxjkl_ch | Linux | v1.0 | ◉ |
| qwexxxiop_ch | Unix | v3.2 | ○ |
| ⋮ | ⋮ | ⋮ | ○ |
| zacxxxbnm_ch | Linux | v4.0 | ○ |
| Confirm | | Cancel | |

APPLICATION REMODELING METHOD, SYSTEM, CLUSTER, MEDIUM, AND PROGRAM PRODUCT

CROSS-REFERENCE TO RELATED APPLICATION

This application is a continuation of International Application PCT/CN2021/137543, filed on Dec. 13, 2021, which claims priority to Chinese Patent Application No. 202110859637.6, filed on Jul. 28, 2021, and Chinese Patent Application No. 202110307720.2, filed on Mar. 23, 2021. All of the aforementioned patent applications are hereby incorporated by reference in their entirety.

TECHNICAL FIELD

This application relates to the field of cloud computing technologies, and in particular, to an application remodeling method, an application management system, a computer cluster, a computer-readable storage medium, and a computer program product.

BACKGROUND

Cloud computing, also referred to as network computing, is an internet-based computing manner. According to this manner, shared software and hardware resources can be provided to users on demand. During deployment of applications in a cloud environment, resources can be obtained on demand based on application load to perform flexible deployment, so that resource utilization can be improved; and costs of modeling and maintaining a data center can be reduced, so that costs can be lowered.

In consideration of advantages of flexible deployment and low costs of the cloud environment, more applications, especially large-scale information technology (IT) applications (such as information management systems with various functions), are performing containerization remodeling to implement migration to the cloud environment. The containerization remodeling is to remodel applications into containers for ease of migration to the cloud. Currently, a mainstream remodeling solution in the industry is that developers manually remodel applications based on experience and capabilities of the developers. Specifically, the developers remodel an installation package of an application into a format suitable for deployment in the cloud environment, for example, an image format. A file in the image format is an image of the application. A container of the application can be created in the cloud environment based on the image of the application, to implement application migration.

However, the foregoing remodeling solution depends on the experience and the capabilities of the developers. Consequently, remodeling efficiency is low, and reliability cannot be ensured. How to provide a reliable and automatic application remodeling method becomes a problem urgently to be resolved.

SUMMARY

This application provides an application remodeling method. According to the method, automatic application remodeling is implemented based on an environment variable of an application in a runtime environment and a code package of the application, so that manual intervention is reduced, and application remodeling efficiency is improved, thereby avoiding a problem that reliability cannot be ensured due to dependence on developer experience. In addition, according to this method, an application is remodeled to obtain an image set including a plurality of images, so that microservices of the application can be implemented, and that the application cannot provide a service due to a single point failure is avoided, thereby improving service quality and reliability. This application further provides an application management system, a computing device cluster, a computer-readable storage medium, and a computer program product corresponding to the foregoing method.

According to a first aspect, this application provides an application remodeling method. The method may be performed by an application management system. The application management system includes a processor and a memory. The processor is configured to execute instructions stored in the memory, to perform the application remodeling method in this application. The following describes the application remodeling method.

Specifically, the application management system may obtain an environment variable of an application in a runtime environment and a code package of the application. The environment variable is an object with a specific name in an operating system. The environment variable includes information used by one or more applications, and specifies the runtime environment of the application in the operating system. Then, the application management system may obtain a remodeling result of the application based on the foregoing environment variable and code package. The remodeling result includes an image set of the application, the image set includes a plurality of images, and a container created based on each image may be configured to execute some modules of the application.

According to this method, automatic application remodeling is implemented based on the environment variable and the code package, so that manual intervention of a user is reduced, and application remodeling efficiency is improved, thereby avoiding a problem that reliability cannot be ensured due to dependence on developer experience. In addition, according to this method, an application is remodeled to obtain an image set including a plurality of images, so that microservices of the application are implemented, and that the application cannot provide a service due to a single point failure can be avoided, thereby improving service quality and stability.

In some possible implementations, the code package of the application may be a source code package, and the source code package indicates an uncompiled code package. The application management system directly performs containerization remodeling based on the source code package. By analyzing the source code package, a plurality of images of the image set can be accurately obtained, ensuring availability and reliability of the images.

In some possible implementations, the application management system may analyze the environment variable to obtain static environment configuration information, and analyze the source code package to obtain container configuration information. The container configuration information includes blocking information of the source code package, and the blocking information is for dividing the source code package into a plurality of code blocks. The blocking information may include a line identifier of each code block, for example, a start line number and an end line number. Correspondingly, the application management system may obtain the image set of the application based on the static environment configuration information and the container configuration information. Each image in the image set is determined based on the static environment configuration information and at least one of the plurality of code blocks.

The application management system may identify code in the source code package based on code development logic by using an artificial intelligence technology, for example, natural language processing, to obtain the blocking information of the source code package. For example, the application management system may identify semantics of functions in code through the natural language processing, so as to divide the source code package into blocks, and obtain the blocking information of the source code package.

In the method, the application management system divides the source code package into blocks. In this case, a plurality of images can be obtained, and microservices of the application can be implemented, thereby avoiding that a service cannot be provided externally due to a single point failure. In addition, precise block division can be implemented. In this way, the plurality of images obtained through splitting are more reasonable and have relatively high availability.

In some possible implementations, at least one image in the image set is obtained by searching an image repository based on the static environment configuration information and the blocking information. Specifically, the image repository includes image sets of a plurality of applications, and an image set of each application includes at least one image. The application management system may search the image repository based on the static environment configuration information and the at least one code block that is determined based on the blocking information, to obtain at least one found image of the application.

When each image in the image set of the application is hit in the image repository, the application management system may directly obtain the image set of the application from the image repository. When the image repository is searched according to the static environment configuration information and the at least one code block that is determined based on the blocking information, and no image is found, the application management system may further generate a corresponding image based on the static environment configuration information and the blocking information.

Because the at least one image may be obtained from the image repository, resources that need to be consumed for generating the image is reduced, and time for obtaining the image is reduced. In this way, application remodeling efficiency is improved.

In some possible implementations, for the application, refer to an external component. The external component is a third-party component. The application management system may analyze the source code package to obtain external component configuration information, where the external component configuration information is for obtaining the external component. The external component configuration information may be, for example, a network address or a storage address of the external component. Then, the application management system may obtain the external component based on the external component configuration information. For example, the application management system may call or access the external component based on the network address or the storage address of the external component, so as to obtain the external component. The external component is associated with the at least one image in the image set. Correspondingly, the remodeling result of the application may further include an association relationship between the external component and the at least one image in the image set.

According to the method, the external component configuration information can be obtained by analyzing the source code package, and the application that references the external component can be automatically remodeled. This method has high availability.

In some possible implementations, images in the image set are usually in a one-to-one correspondence with containers that carry the images. Based on this, the application management system may determine, based on the association relationship between the external component and the at least one image in the image set, an association relationship between a container that carries each image and the external component. This can help migrate an application to a cloud environment subsequently.

In some possible implementations, the application management system may further obtain the runtime code of the application in the runtime environment, to obtain runtime environment configuration information. The runtime environment configuration information includes a basic associated package associated with the application when the application runs in the runtime environment. The basic associated package may be one or more of a basic dependency package (such as Tomcat, Java, or mvn), a compilation-related package (such as gcc, glib, or make), and an installation-related package (such as an expect component or a py reference library).

Correspondingly, the application management system may obtain the image set of the application based on the static environment configuration information, the runtime environment configuration information, and the container configuration information. The at least one image in the image set may be determined based on the static environment configuration information, at least one of the plurality of code blocks, and the basic associated package.

According to the method, the runtime code of the application in the runtime environment is analyzed to obtain the runtime environment configuration information. The image of the application is obtained with reference to the runtime environment configuration information, so that accuracy of the obtained image of the application can be improved, and a service requirement is met.

In some possible implementations, the container configuration information further includes a calling relationship between code blocks, and the remodeling result further includes the calling relationship between the code blocks. The calling relationship between the code blocks may indicate a calling relationship between images corresponding to the code blocks, and further indicate a calling relationship between containers that carry the images. This can help migrate an application to a cloud environment.

In some possible implementations, the application management system may present a configuration interface to the user. The configuration interface provides a plurality of source code package names. The application management system may receive a source code package name that is of the application and that is selected by the user on the configuration interface, and then obtain, from a software repository, a source code package corresponding to the selected source code package name of the application. The software repository includes a plurality of source code packages.

The method allows the user to select a source code package for application remodeling, so that a personalized requirement of the user can be met.

In some possible implementations, the application management system may further receive the source code package that is of the application and that is uploaded by the user.

The source code package that is of the application and that is uploaded by the user may be a source code package of a user-developed application or a source code package of another non-open source application. In this way, the self-developed application or the non-open source application can be remodeled.

According to a second aspect, this application provides an application management system. The system includes:

an application awareness subsystem, configured to obtain an environment variable of an application in a runtime environment and a source code package of the application; and an image management subsystem, configured to obtain a remodeling result of the application based on the environment variable and the code package, where the remodeling result includes an image set of the application, the image set includes a plurality of images, and a container created based on each image is configured to execute some modules of the application.

In some possible implementations, the code package is a source code package, and the source code package indicates an uncompiled code package.

In some possible implementations, the system further includes:

an analysis subsystem, configured to analyze the environment variable to obtain static environment configuration information; and analyze the source code package to obtain container configuration information, where the container configuration information includes blocking information of the source code package, and the blocking information is for dividing the source code package into a plurality of code blocks, where the image management subsystem is configured to obtain the image set of the application based on the static environment configuration information and the container configuration information, where each image in the image set is determined based on the static environment configuration information and at least one of the plurality of code blocks.

In some possible implementations, at least one image in the image set is obtained by searching an image repository based on the static environment configuration information and the blocking information.

In some possible implementations, the analysis subsystem is configured to analyze the source code package to obtain external component configuration information; and the system further includes: a container management subsystem, configured to obtain an external component based on the external component configuration information, where the external component is associated with the at least one image in the image set, and the remodeling result further includes an association relationship between the external component and the at least one image in the image set.

In some possible implementations, the analysis subsystem is further configured to: obtain runtime code of the application in the runtime environment, and obtain runtime environment configuration information, where the runtime environment configuration information includes a basic associated package associated with the application when the application runs in the runtime environment; and the image management subsystem is configured to obtain the image set of the application based on the static environment configuration information, the runtime environment configuration information, and the container configuration information, where the at least one image in the image set is determined based on the static environment configuration information, the at least one of the plurality of code blocks, and the basic associated package.

In some possible implementations, the container configuration information further includes a calling relationship between code blocks, and the remodeling result further includes the calling relationship between the code blocks.

According to a third aspect, this application provides a computing device cluster. The computing device cluster includes at least one computing device. Each computing device includes a processor and a memory. The processor and the memory communicate with each other. The processor is configured to execute instructions stored in the memory, to enable the computing device cluster to perform the application remodeling method according to any one of the first aspect or the implementations of the first aspect.

According to a fourth aspect, this application provides a computer-readable storage medium. The computer-readable storage medium stores instructions. The instructions instruct a device to perform the application remodeling method according to any one of the first aspect or the implementations of the first aspect.

According to a fifth aspect, this application provides a computer program product including instructions. When the computer program product runs on a device, the device is enabled to perform the application remodeling method according to any one of the first aspect or the implementations of the first aspect.

In this application, based on the implementations according to the foregoing aspects, the implementations may be further combined to provide more implementations.

BRIEF DESCRIPTION OF DRAWINGS

To describe the technical methods in embodiments of this application more clearly, the following briefly describes the accompanying drawings used in describing embodiments.

DESCRIPTION OF EMBODIMENTS

The terms "first" and "second" in embodiments of this application are merely intended for a purpose of description, and shall not be understood as an indication or implication of relative importance or implicit indication of a quantity of indicated technical features. Therefore, a feature limited by "first" or "second" may explicitly or implicitly include one or more features.

For ease of understanding of embodiments of this application, some terms in this application are first explained and described.

An application (APP) is a computer program written for a specific application purpose of a user. Applications may be classified into different types based on application purposes or functions. For example, the applications may include types such as an e-commerce application, a social application, an office application, and a recreational application.

An image is a union file system that contains a plurality of read-only layers. The union file system can integrate different read-only layers into one file system, and provide a unified perspective for these read-only layers. In this way, existence of a plurality of layers is hidden. From a perspective of a user, an image has a read-only file system. An image provides a lightweight code package of an element required for running an application. An image may be understood as an installation package in a specific format that needs to be obtained when an application is used. The specific format may be, for example, an optical disc image file (IsoBuster, ISO) format.

A container is a running instance created using an image. The running instance may be a union file system including at least one read-only layer and one read-write layer. The union file system can integrate the at least one read-only layer and one read-write layer into one file system, so as to provide a unified perspective for these read-only layers. In this way, existence of a plurality of layers is hidden. From a perspective of a user, a container has a readable and writable file system. A container runs a lightweight code package of an element required by an application, to implement operating system-level virtualization, so that the application runs in a relatively independent and isolated environment. This simplifies an application deployment process and enhances application portability and security.

Applications can be classified into containerized applications and non-containerized applications based on whether containerization is performed. Many conventional applications (such as an attendance management system and a production management system) are non-containerized applications. With the continuous development of cloud computing technologies, more developers choose to remodel non-containerized applications into containerized applications, so as to migrate applications to a cloud environment, thereby improving fault tolerance and reducing management costs.

Currently, a mainstream remodeling solution in the industry is that developers remodel, based on experience and capabilities of the developers, an installation package of the foregoing non-containerized application into a format suitable for deployment in the cloud environment, to deploy the remodeled installation package in the cloud environment, so as to migrate the application to the cloud environment. However, this remodeling solution depends on the experience and capabilities of the developers. Consequently, migration efficiency is low, and reliability cannot be ensured.

In view of this, an embodiment of this application provides an application remodeling method. The method may be performed by an application management system. The application management system may be a system having an application management function (for example, an application remodeling function). The system includes a processor and a memory. The processor is configured to execute instructions stored in the memory, to perform the application remodeling method.

Specifically, the application management system obtains an environment variable corresponding to an application in a runtime environment and a code package of the application, and then obtains a remodeling result of the application based on the environment variable and the code package. The remodeling result includes an image set of the application, the image set includes a plurality of images, and a container created based on each image is configured to execute some modules of the application.

According to this method, automatic application remodeling is implemented based on the environment variable and the code package, so that manual intervention of a user is reduced, and application remodeling efficiency is improved, thereby avoiding a problem that reliability cannot be ensured due to dependence on developer experience. In addition, according to this method, an application is remodeled to obtain an image set including a plurality of images, so that microservices of the application are implemented, and that the application cannot provide a service due to a single point failure can be avoided, thereby improving service quality and stability.

Further, when containerization remodeling is performed on the application, the containerization remodeling may be directly performed based on a source code package and the environment variable. The source code package indicates an uncompiled code package. In comparison with remodeling an application-based installation package, in this method, the containerization remodeling is directly performed based on the source code package and the environment variable of the application. The plurality of images of the image set can be accurately obtained by analyzing the source code package, thereby ensuring availability and reliability of the images.

The application management system in this embodiment of this application may be configured to perform the containerization remodeling on different types of applications, to implement application migration. For example, the application management system may remodel an e-commerce platform, to obtain an image set including a plurality of images. In this way, a plurality of containers may be created by using the plurality of images, so that the e-commerce platform is migrated from a local server to a cloud environment, and a service can be provided externally in a microservice manner. The local server may be a private server of an application owner (for example, a developer). The cloud environment indicates a cloud computing device cluster that is owned by a cloud service provider and that is for providing computing, storage, and communication resources. The cloud computing device cluster includes at least one cloud computing device, and the cloud computing device includes a cloud server.

For another example, the application management system may remodel a production management system, obtain an image set of the production management system, and migrate the production management system to the cloud environment by using a plurality of images in the image set. Similarly, the application management system may further remodel a game, obtain an image set of the game, and migrate the game to the cloud environment by using a plurality of images in the image set. Applications migrated to the cloud environment can provide corresponding services for users in the form of cloud services.

To make the technical solutions of this application clearer and easier to understand, the following describes a system architecture in embodiments of this application.

Figure 1:
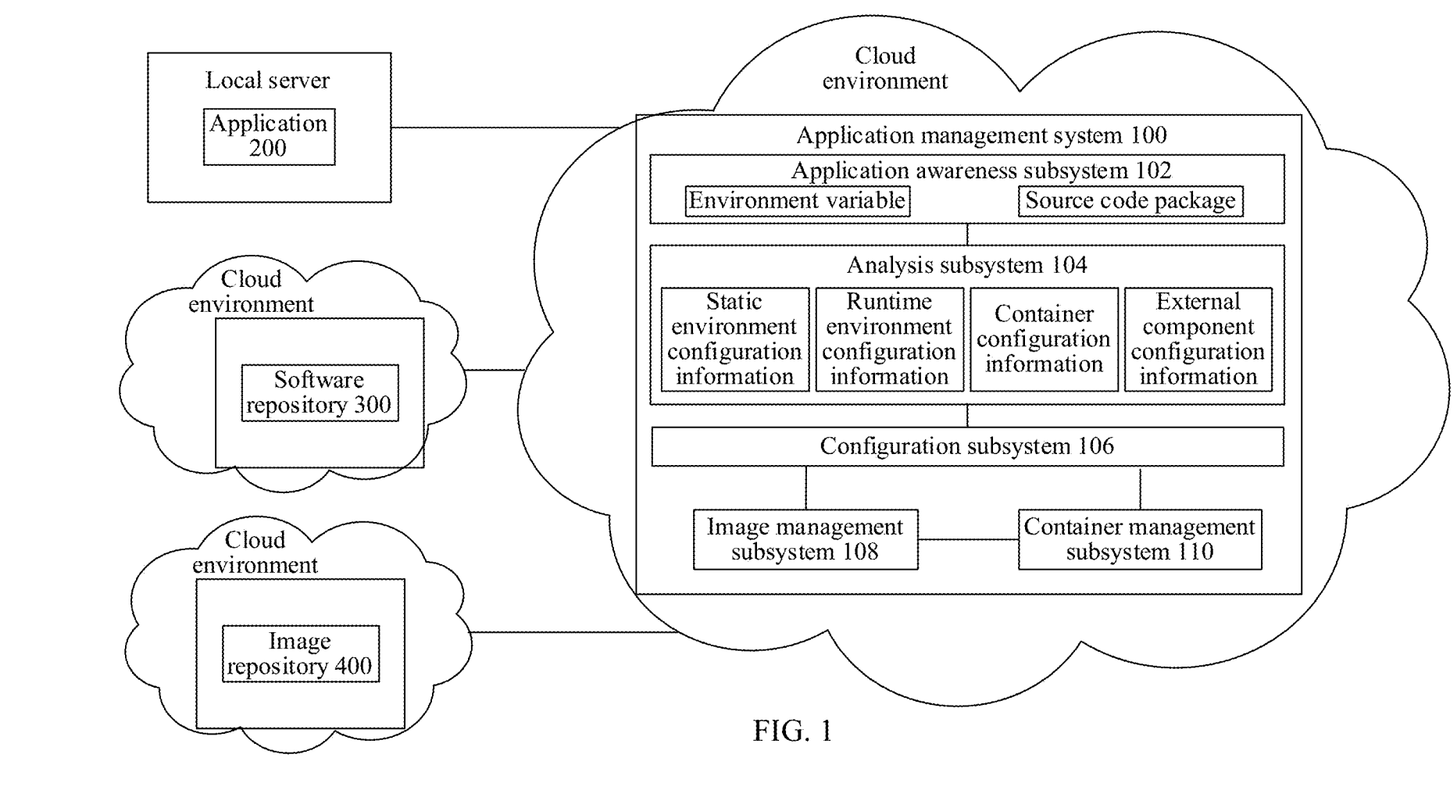
FIG. 1 is a diagram of a system architecture of an application remodeling method according to an embodiment of this application.

FIG. 1 is a diagram of a system architecture of an application remodeling method. An application management system 100 is deployed in a cloud environment. The cloud environment indicates a cloud computing device cluster that is owned by a cloud service provider and that is for providing computing, storage, and communication resources. The cloud computing device cluster includes at least one cloud server. The application management system 100 may be centrally deployed in one cloud server, or may be deployed in a plurality of cloud servers in a distributed manner. An application 200 is deployed on a local server. A communication connection may be established between the cloud server on which the application management system 100 is deployed and the local server on which the application 200 is deployed. Alternatively, the application 200 may be deployed on a cloud server. The following describes an example in which the application 200 is deployed on the local server.

The application management system 100 is configured to remodel the application 200 to be deployed on the local server, so as to migrate the application 200 to the cloud environment. The application management system 100 may interact with the application 200, to remodel the application 200. In some possible implementations, the application management system 100 may further interact with a software repository 300 and an image repository 400, to remodel the application 200.

The software repository 300 is configured to provide a code package of at least one application. The code package may be a source code package. The source code package indicates an uncompiled code package.

The image repository 400 is configured to provide an image set of at least one application. The image set includes a plurality of images. The container created based on each image is configured to execute some modules of the application.

FIG. 1 is described by using an example in which the software repository 300 and the image repository 400 are deployed on different cloud computing device clusters. In another possible implementation of this embodiment of this application, the software repository 300 and the image repository 400 may be deployed on a same cloud computing device cluster, or may be deployed on the local server.

Specifically, the application management system 100 obtains an environment variable of an application 200 in a runtime environment and a code package of the application 200. For example, the application management system 100 may access the runtime environment of the application 200, obtain the environment variable of the application 200 in the runtime environment, and obtain the code package of the application 200 from the software repository 300. The code package may be a source code package. The application management system 100 obtains a remodeling result of the application 200 based on the environment variable and the code package. The remodeling result includes an image set of the application 200. A container created based on each image in the image set is configured to execute some modules of the application.

It should be noted that the application management system 100 may not use the software repository 300 to obtain the code package of the application 200 by, but directly receives the code package of the application 200 uploaded by a user. Similarly, the application management system 100 may not use the image repository 400 to obtain the image, but directly generates an image based on the environment variable and the source code package.

The foregoing describes in detail an interaction process between the application management system 100 and the application 200, the software repository 300, and the code repository 400. The following describes internal structures of the application management system 100 and an interaction process thereof.

Specifically, the application management system 100 includes a plurality of parts. For example, the application management system 100 may include a plurality of subsystems. Further, the subsystem may include a plurality of modules. The subsystems and the modules in the application management system 100 may be divided in a plurality of manners. This is not limited in this application.

FIG. 1 is an example division manner. As shown in FIG. 1, the application management system 100 includes an application awareness subsystem 102 and an image management subsystem 108. In some possible implementations, the application management system 100 further includes one or more of an analysis subsystem 104, a configuration subsystem 106, and a container management subsystem 110. The following describes each subsystem in detail.

The application awareness subsystem 102 is configured to obtain the environment variable and the source code package of the application 200 in the runtime environment. The environment variable is an object with a specific name in an operating system (OS). The environment variable includes information used by one or more applications, and specifies the runtime environment of the application 200 in the operating system. In some embodiments, the environment variable includes one or more of PATH, JAVA HOME, or CLASS PATH. JAVA HOME indicates a path of an executable file corresponding to a JAVA command. PATH indicates a search scope of an executable file. After PATH is configured, in whichever directory a JAVA command is executed, an executable file of the JAVA command can be searched for based on the foregoing search scope. CLASS PATH specifies a directory where a JAVA class is located. The environment variable may further include an operating system type, an operating system version, a kernel version, a basic dependency package of the operating system, an operating system runtime parameter, or the like. The operating system runtime parameter is a parameter used when the operating system is running, for example, a semaphore inside an OS kernel.

In some possible implementations, the application awareness subsystem 102 may include an environment awareness module and a software awareness module. The environment awareness module is configured to: access a runtime environment of the application 200, and obtain the environment variable of the application 200 in the runtime environment. The software awareness module is configured to obtain the code package of the application 200, for example, obtain the source code package of the application 200 from the software repository 300.

The environment awareness module may obtain access information of the application 200, for example, obtain a network address (IP) of the application 200, to access the application 200, and then scan the local server on which the application 200 is located, to obtain the environment variable. Further, the application 200 may further perform authentication on an access request. Based on this, the access information may further include identity information, and the identity information may include a user name and a password. In some embodiments, the identity information may further include one or more of a fingerprint, a voiceprint, an iris, or the like. The application 200 performs authentication based on the identity information. When the authentication succeeds, the application management system 100 (for example, an environment awareness module of an application awareness subsystem 102 in the application management system 100) is allowed to access the application 200.

The software awareness module provides a configuration interface. The configuration interface can be a graphical user interface (GUI) or a command user interface. The configuration interface may present a plurality of code package identifiers to the user, where the code package identifier may be a code package name. The software awareness module may receive a code package name that is of the application 200 and that is selected by the user by using the configuration interface, and obtain, from the software repository 300, a code package corresponding to the code package name that is of the application 200 and that is selected by the user. The software repository 300 includes a plurality of source code packages, and the code package obtained by the software awareness module may include one of the plurality of source code packages.

Figure 2:
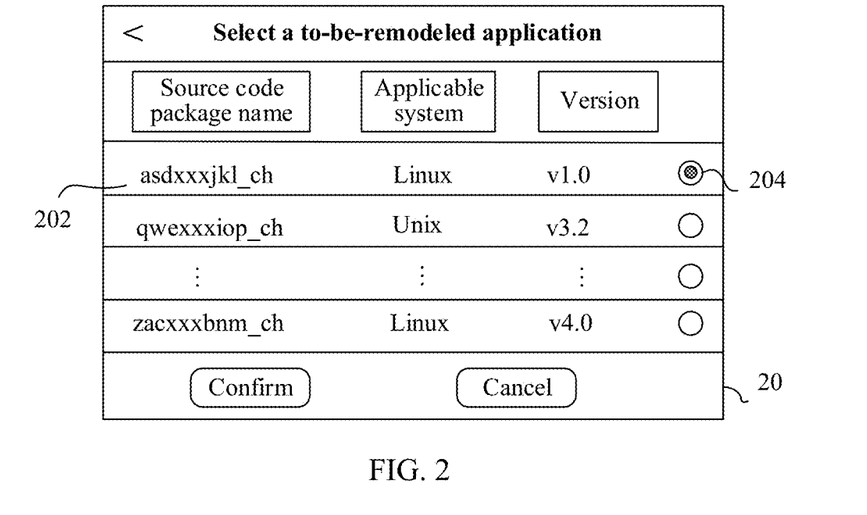
FIG. 2 is a schematic diagram of a configuration interface according to an embodiment of this application.

The following describes an example in which the software awareness module obtains the source code package of the application 200 by using the GUI.

FIG. 2 is a schematic diagram of a configuration interface. The configuration interface 20 presents attribute information 202 of source code packages of a plurality of applications in the software repository 300. The attribute information 202 includes a source code package name, an applicable operating system, and a source code package version. The configuration interface 20 further includes a selection control 204 of the source code package. The user may select one or more source code packages by using the selection control 204 based on the attribute information 202 of the source code package.

When the user triggers a confirmation control 206 carried on the configuration interface 20, the software awareness module may generate a source code package obtaining request in response to the operation, where the request is specifically used to request to obtain, from the software repository 300, the source code package selected by the user. In some embodiments, when the user triggers a cancel control 208 carried on the configuration interface 20, the software awareness module may abandon the operation of obtaining the source code package of the application 200.

The image management subsystem 108 is configured to obtain a remodeling result of the application 200 based on the environment variable and the source code package, where the remodeling result includes an image set of the application 200. The image set includes a plurality of images. A container created based on each image is configured to execute some modules of the application 200. For example, for an application of an e-commerce platform, a remodeled container created based on each image in the image set is separately configured to executing a user management module, an evaluation management module, an order management module, and a commodity management module of the e-commerce platform.

It should be noted that the image management subsystem 108 may support obtaining the images of the application 200 by searching the image repository 400. For an image that is not found in the image repository 400, the image management subsystem 108 generates a corresponding image. In this way, unnecessary image generation operations can be reduced.

In some possible implementations, the application management system 100 further includes at least one of an analysis subsystem 104, a configuration subsystem 106, and a container management subsystem 110. The analysis subsystem 104 is configured to: analyze the environment variable to obtain static environment configuration information, and analyze the source code package to obtain container configuration information.

The static environment configuration information may be environment configuration information used when the application 200 is not running. The environment configuration information is for describing a requirement of the application 200 on an environment. The static environment configuration information may include one or more of an operating system type, an operating system version, PATH, or the like. It should be noted that the source code package of the application 200 may also include information such as the operating system type, and the application management system 100 may perform verification based on the operating system type in the static environment configuration information and the operating system type obtained from the source code package, thereby ensuring reliability.

The container configuration information may be configuration information of a container used to generate the application 200. The container is generated based on an image. Based on this, the container configuration information may include information for generating an image. In some embodiments, the container configuration information may include blocking information of the source code package. The blocking information is for dividing the source code package into a plurality of code blocks. The blocking information may include a line identifier of each code block, for example, a start line number and an end line number. An e-commerce platform is used as an example. The blocking information may be a start line number and an end line number of a code block corresponding to a user management module, an evaluation management module, an order management module, or a commodity management module. At least one of the plurality of code blocks may be used to generate an image of the application 200.

The analysis subsystem 104 may identify code in the source code package based on code development logic by using an artificial intelligence (AI) technology, for example, natural language processing (NLP), to obtain the blocking information of the source code package. For example, the analysis subsystem 104 may identify semantics of functions in the code by using the NLP, so as to divide the source code package into blocks, and obtain the blocking information of the source code package.

Correspondingly, the image management subsystem 108 may obtain the image set of the application based on the static environment configuration information and the container configuration information. Each image in the image set is determined based on the static environment configuration information and the at least one of the plurality of code blocks. Specifically, the image management subsystem 108 may search the image repository 400 based on the static environment configuration information and the at least one code block, to obtain the at least one image in the image set. For an image that is not found, the image management subsystem 108 may generate a corresponding image based on the static environment configuration information and the at least one code block. For example, the image management subsystem 108 may obtain a basic image based on the static environment configuration information, and the basic image may be, for example, an operating system image. Then, the image management subsystem 108 compiles the at least one code block, and installs the compiled code block into the operating system image, to obtain a corresponding image. In some embodiments, the image management subsystem 108 may further publish the generated image to the image repository 400 for subsequent use.

Further, the container configuration information may further include a calling relationship between code blocks. The e-commerce platform is still used as an example. The evaluation management module can call the order management module to evaluate an order. Based on this, the container configuration information may include a calling relationship between a code block corresponding to the evaluation management module and a code block corresponding to the order management module. Correspondingly, the remodeling result further includes a calling relationship between code blocks. The calling relationship between the code blocks and a correspondence between a code block and an image may be used to determine a calling relationship between images. In this way, when a container that carries an image runs, calling between containers may be implemented based on the calling relationship between the images.

In some possible implementations, the analysis subsystem 104 is further configured to obtain runtime code of the application 200 in the runtime environment, and runtime environment configuration information may be obtained by analyzing the runtime code. The runtime environment configuration information includes a basic associated package associated with the application 200 when the application 200 runs in the runtime environment. The basic associated package may be one or more of a basic dependency package (such as Tomcat, Java, or mvn), a compilation-related package (such as gcc, glib, or make), and an installation-related package (such as an expect component or a py reference library). Based on this, the image management subsystem 108 may determine the image of the application 200 based on the static environment configuration information, the at least one of the plurality of code blocks, and the basic associated package.

Further, the runtime environment configuration information may further include one or more of operating system environment variables (for example, sysctl used for kernel configuration, PATH indicating a search scope, a pluggable authentication module (PAM) for verifying an identity or a status), and an external resource (for example, an IP resource, a computing resource, or a memory resource) on which running of the application 200 depends. Before determining an image, the image management subsystem 108 may further verify the static environment configuration information and the runtime environment configuration information, for example, verify an operating system environment variable in the static environment configuration information and an operating system environment variable in the runtime environment configuration information. When the verification succeeds, the image of the application 200 is determined.

The configuration subsystem 106 is configured to assemble the static environment configuration information, the runtime environment configuration information, and the container configuration information to generate an image configuration file. The image configuration file is used to describe data or resources required for generating an image. Correspondingly, the image management subsystem 108 may obtain the image set of the application 200 based on the image configuration file assembled by using the static environment configuration information, the runtime environment configuration information, and the container configuration information.

Considering that the application 200 references an external component (which may also be referred to as a third-party component), the analysis subsystem 104 may be further configured to analyze the source code package to obtain external component configuration information. The external component is a component other than a self-owned component, and the external component may be, for example, an external database, that is, a third-party database. The container management subsystem 110 is configured to obtain the external component based on the external component configuration information, where the external component is associated with the at least one image in the image set. Based on this, the remodeling result may further include an association relationship between the external component and the at least one image in the image set.

The container management subsystem 110 is configured to create a container based on each of a plurality of images in the image set. For example, the container may be created based on a creation script based on each of the plurality of images in the image set, and then based on the association relationship between the external component and the at least one image in the image set, the external component is associated with a corresponding container, so as to migrate the application 200. When creating a container, the container management subsystem 110 may create a container of the application 200 by using a container platform. The container platform is specifically a tool that deploys an application in a cloud environment and provides a full-stack IT automatic O&M capability.

It should be noted that FIG. 1 is described by using an example in which the application management system 100 is deployed in the cloud environment. In another possible implementation of this embodiment of this application, the application management system 100 may alternatively be deployed in an edge environment, for example, deployed on one or more computing devices (that is, edge computing devices) in the edge environment, and the edge computing device may be a server, a computing box, or the like. The application management system 100 may be further deployed in a terminal device. The end device includes but is not limited to a desktop computer, a notebook computer, a smartphone, or a local server. When the application management system 100 is deployed on the local server, the application management system 100 and the application 200 may be deployed on a same local server or deployed on different local servers.

Parts of the application management system 100 may also be deployed in different environments in a distributed manner. For example, a part of the application management system 100 may be separately deployed in three environments of the cloud environment, the edge environment, and the terminal device, or any two of the three environments.

The foregoing describes in detail a system architecture of the application management system 100. The following describes in detail, from a perspective of the application management system 100, the application remodeling method provided in embodiments of this application.

Figure 3:
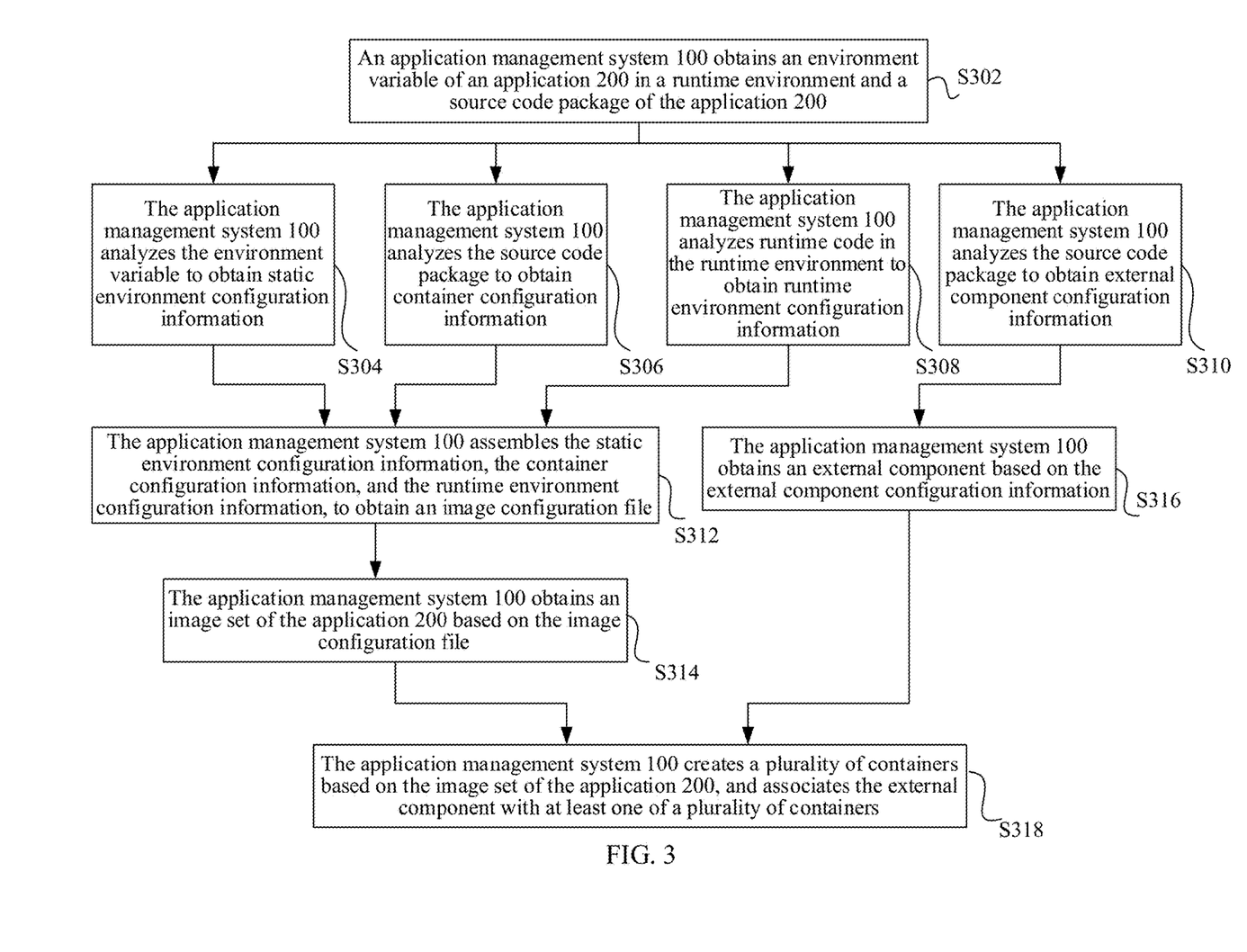
FIG. 3 is a flowchart of an application remodeling method according to an embodiment of this application.

FIG. 3 is a flowchart of the application remodeling method. The method includes the following steps.

S302: The application management system 100 obtains an environment variable of an application 200 in a runtime environment and a source code package of the application 200.

Specifically, the application management system 100 may access the runtime environment of the application 200, to obtain the environment variable of the application 200 in the runtime environment. The environment variable is an object with a specific name in an OS, for example, an object whose name is PATH, JAVA HOME, or CLASS PATH. These objects include information used by one or more applications, and specify the runtime environment of the application in the OS. The environment variable may further include an operating system type, an operating system version, a kernel version, a basic dependency package of the operating system, an operating system runtime parameter, or the like. The operating system runtime parameter is a parameter used when the operating system is running, for example, a semaphore inside the OS kernel.

The source code package is a code package formed by source code written by an application developer based on any one or more program design languages of computer languages such as a C language, a JAVA language, and a Python language. The source code package is an uncompiled code package, and can reflect development logic of the application 200. The application management system 100 may obtain the source code package from the software repository 300. Specifically, the application management system 100 may search the software repository 300 based on a source code package identifier of the application 200, to obtain a source code package that matches the source code package identifier of the application 200. The source code package identifier may be a source code package name. The application management system 100 may present a configuration interface to a user, and then receive a source code package identifier selected by the user by using the configuration interface, so as to search the software repository 300 based on the source code package identifier to obtain the corresponding source code package.

S304: The application management system 100 analyzes the environment variable to obtain static environment configuration information.

The static environment configuration information may be environment configuration information used when the application 200 is not running. The environment configuration information is for describing a requirement of the application 200 on an environment. The static environment configuration information may include one or more of an operating system type, an operating system version, PATH, or the like.

The application management system 100 may extract, from the environment variable, the requirement of the application 200 on the environment. The requirement may be a requirement of the application 200 on an operating system and a computing resource. Then, the application management system 100 may obtain the static environment configuration information based on the requirement.

S306: The application management system 100 analyzes the source code package to obtain container configuration information.

The container configuration information may be configuration information for generating a container. The container is a running instance generated based on an image. Therefore, the container configuration information includes information for generating an image. In some embodiments, the container configuration information may include blocking information of the source code package. The blocking information is for dividing the source code package into a plurality of code blocks. The blocking information may include a line identifier of each code block, for example, a start line number and an end line number.

In a specific implementation, the application management system 100 may identify code in the source code package based on code development logic by using an AI technology, for example, NLP, to obtain the blocking information of the source code package. For example, an analysis subsystem 104 in the application management system 100 may identify semantics of functions in the code through the NLP, to divide the source code package into blocks, and obtain the blocking information of the source code package.

Further, the application management system 100 analyzes a calling relationship between the functions in the source code package, to obtain a calling relationship between code blocks. Correspondingly, the container configuration information may further include the calling relationship between the code blocks. An e-commerce platform is used as an example. The container configuration information may further include a calling relationship between code blocks corresponding to a user management module, an evaluation management module, an order management module, and a commodity management module. The calling relationship may reflect an upstream and downstream dependency relationship of the application 200.

In addition, the container configuration information may further include service configuration information and/or a basic associated package. The service configuration information includes one or more of an external service IP address and IP addresses of peripheral components (such as a database, a cache, and a message queue). The basic associated package may be one or more of a basic dependency package (such as Tomcat, Java, or mvn), a compilation-related package (such as gcc, glib, or make), and an installation-related package (such as an expect component or a py reference library).

The container configuration information may be expressed by using a relationship graph. For ease of differentiation, a relationship graph corresponding to the container configuration information is referred to as an application dependency graph in this application. The application management system 100 may model an application dependency graph by using a configuration file that records the blocking information and service configuration information, a basic dependency package, and the like as nodes.

S308: The application management system 100 obtains runtime code of the application 200 in the runtime environment, and obtains runtime environment configuration information.

Specifically, the runtime environment configuration information includes a basic associated package associated with the application 200 when the application 200 runs in the runtime environment. The basic associated package may be one or more of a basic dependency package (such as Tomcat, Java, or mvn), a compilation-related package (such as gcc, glib, or make), and an installation-related package (such as an expect component or a py reference library).

Further, the runtime environment configuration information further includes one or more of operating system environment variables (for example, sysctl used for kernel configuration, PATH indicating a search scope, a pluggable authentication module (PAM) for verifying an identity or a status), and an external resource (for example, an IP resource, a computing resource, or a memory resource) on which running of the application 200 depends.

The application management system 100 first obtains the runtime code of the application 200 in the runtime environment, and then analyzes the runtime code, for example, analyzes the runtime code by using an AI technology, to obtain the runtime environment configuration information.

Because the runtime environment configuration information includes information such as the operating system environment variable, based on this, the application management system 100 may further perform, based on the runtime environment configuration information and the static environment configuration information, second verification on information including the operating system environment variable, and perform S312 after the check succeeds.

Similarly, the runtime environment configuration information includes a basic associated package (for example, a basic dependency package) of the application 200 used when the application 200 runs. Based on this, the application management system 100 may further perform the second verification on the basic associated package and the like based on the runtime environment configuration information and the container configuration information, and perform S312 after the verification succeeds.

The runtime environment configuration information may be represented by using a relationship graph. For ease of differentiation, the relationship graph corresponding to the runtime environment configuration information may be referred to as an environment dependency graph. Specifically, the application management system 100 may model an environment dependency graph by using the environment variable as a node.

It should be noted that the application management system 100 may further generate a dependency graph of the application 200 based on the application dependency graph and the environment dependency graph. Refer to a schematic diagram of a dependency graph shown in FIG. 4. For an application on which containerization remodeling is to be performed, a graph generated based on a static environment and the runtime environment is the environment dependency graph, and a graph generated based on the source code package is the application dependency graph.

Figure 4:
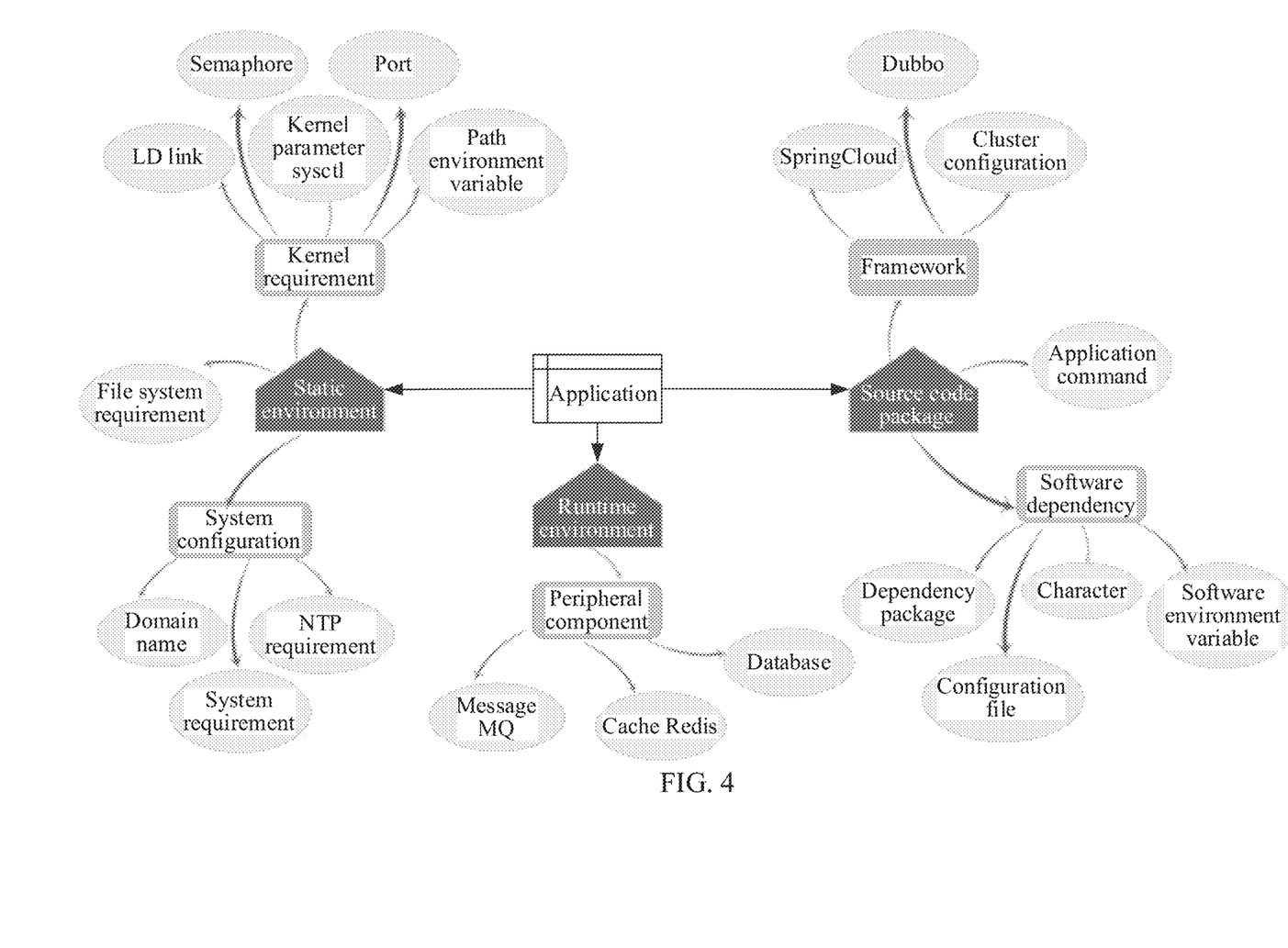
FIG. 4 is a schematic diagram of an application dependency graph according to an embodiment of this application.

The environment dependency graph describes a requirement of the application on the static environment, for example, a kernel requirement and a file system requirement. The kernel requirement includes a kernel parameter sysctrl, an environment variable Path, a semaphore, a port, or an LD link. The file system requirement includes a type and a size (not shown in the figure) of a file system, and the like. The requirement of the application on the static environment may also include a system configuration. The system configuration includes a domain name, a system requirement, and a network time protocol (NTP) requirement of the application.

The environment dependency graph further describes the requirement of the application on the runtime environment. The requirement of the application on the runtime environment includes dependency on peripheral components. The peripheral components may specifically include a message queue (MQ), a cache (for example, Redis), a database, and the like.

The application dependency graph describes a framework, an application command, and software dependency that are determined by analyzing the source code package of the application. The framework may include SpringCloud, Dubbo, and the like. The software dependency may include a dependent module (such as a basic dependency library) and a configuration file.

The application management system 100 may obtain a relatively complete dependency graph by splicing the application dependency graph and the environment dependency graph.

S310: The application management system 100 analyzes the source code package to obtain external component configuration information.

An external component is a third-party component. The application management system 100 may analyze source code in the source code package based on development logic of the application, determine an external component referenced in the source code package, and obtain the external component configuration information based on information about the referenced external component, for example, an identifier of the external component. The external component configuration information is used to obtain the external component. Based on this, the external component configuration information may be, for example, an IP address of the external component or a storage address of the external component. For example, when the external component is an external database, the external component configuration information may be an IP address of the external database. For another example, when the external component is an external operation component, the external component configuration information may be a storage address of the external operation component.

It should be noted that S304 to S310 are optional steps in this embodiment of this application. In another possible implementation of this embodiment of this application, the application management system 100 may not perform S304 to S310, or may perform one or more steps in S304 to S310.

S312: The application management system 100 assembles the static environment configuration information, the runtime environment configuration information, and the container configuration information, to obtain an image configuration file.

The image configuration file indicates to generate an image. Specifically, the application management system 100 may fill in the static environment configuration information, the runtime environment configuration information, and the container configuration information based on a template of the image configuration file, to obtain the image configuration file.

It should be noted that S310 and S312 are optional steps in this embodiment of this application, and the application management system 100 may not perform the steps of obtaining the external component configuration information and obtaining the corresponding external component in S310 and S312. The application management system 100 may assemble the static environment configuration information and the container configuration information to obtain the image configuration file.

S314: The application management system 100 obtains an image set of the application 200 based on the image configuration file.

The image set includes a plurality of images. Each image may be determined based on the static environment configuration information, the runtime environment configuration information, and the container configuration information in the image configuration file. Specifically, the application management system 100 may search the image repository 400 based on the static environment configuration information, the runtime environment configuration information, and the container configuration information (for example, the blocking information in the container configuration information), to obtain at least one image.

When an image that corresponds to each code block and that is determined based on the blocking information is hit in the image repository 400, the application management system 100 may obtain the image set of the application 200. When an image that corresponds to at least one of a plurality of code blocks and that is determined based on the blocking information is not hit in the image repository 400, the application management system 100 may generate a corresponding image based on the static environment configuration information, the runtime environment configuration information, and the at least one code block.

The following describes in detail a process in which the application management system 100 generates an image.

First, the application management system 100 may obtain a basic image, that is, an operating system image, based on information related to the operating system in the environment configuration information, such as an operating system name and the operating system version. The environment configuration information may be at least one of the static environment configuration information or the runtime environment configuration information. In some embodiments, the application management system 100 may further verify the static environment configuration information and the runtime environment configuration information. For example, the application management system 100 may compare operating system-related information in the static environment configuration information with operating system-related information in the runtime environment configuration information. When a comparison result is consistent, the verification succeeds, and an operating system image may be obtained based on the operating system-related information. Then, the application management system 100 may compile the at least one of the plurality of code blocks obtained by dividing the blocking information in the container configuration information, and then install the compiled code block into a corresponding operating system image, to obtain the image of the application 200.

It should be noted that S314 is a specific implementation of obtaining, by the application management system 100, the image of the application 200 based on the environment variable and the source code package. The image set of the application 200 may alternatively be obtained in another manner by performing the application remodeling method in this embodiment of this application.

S316: The application management system 100 obtains the external component based on the external component configuration information.

Considering that the application 200 references the external component, the application management system 100 may obtain the external component based on the external component configuration information. The external component configuration information may include an IP address or a storage address of the external component. The application management system 100 may obtain the external component based on the IP address or the storage address of the external component. For example, when the external component is an external database, the application management system 100 may access the external database by using an IP address of the external database.

The external component is associated with the at least one image in the image set of the application 200. The remodeling result of the application 200 further includes an association relationship between the external component and at least one image in the image set.

S318: The application management system 100 creates a plurality of containers based on the image set of the application 200, and associates the external component with at least one of the plurality of containers.

Specifically, the application management system 100 may be connected to a container platform, and then perform, by using the container platform, a container creation operation on each image in the image set of the application 200, to obtain a container corresponding to each image. Then, the application management system 100 may associate the external component with at least one container, to migrate the application 200 to a cloud environment. The at least one container associated with the external component is a container created based on an image corresponding to a code block that references the external component. The application management system 100 may determine an association relationship between the external component and the container based on the association relationship between the external component and the at least one image and the correspondence between the image and the container, to associate the external component with the corresponding container.

S316 to S318 are a specific implementation of migrating the application 200 in this embodiment of this application.

In another possible implementation of this embodiment of this application, the application management system 100 may not perform S316 to S318. For example, the application management system 100 may directly create a container based on the images in the image set, to migrate the application 200.

It should be noted that the embodiment shown in FIG. 3 is described by using an example in which the application 200 is remodeled based on the source code package of the application 200. In another possible implementation of this embodiment of this application, the application management system 100 may alternatively remodel the application 200 based on another code package of the application 200, for example, an installation package.

Based on the foregoing content descriptions, an embodiment of this application provides an application remodeling method. According to the method, automatic application remodeling is performed based on the source code package of the application 200 and the environment variable of the application 200 in the runtime environment, so that manual intervention of a user is reduced, and application remodeling efficiency is improved. In addition, according to this method, an application is remodeled to obtain an image set including a plurality of images, so that microservices of the application can be implemented, and that the application cannot provide a service due to a single point failure can be avoided, thereby improving service quality and stability.

The foregoing describes in detail the application remodeling method provided in embodiments of this application with reference to FIG. 1 to FIG. 4. The following describes an application management system provided in embodiments of this application with reference to the accompanying drawings.

FIG. 1 is a schematic diagram of a structure of the application management system 100. The system 100 includes:

an application awareness subsystem 102, configured to obtain an environment variable of an application in a runtime environment and a source code package of the application; and an image management subsystem 108, configured to obtain a remodeling result of the application based on the environment variable and the code package, where the remodeling result includes an image set of the application, the image set includes a plurality of images, and a container created based on each image is configured to execute some modules of the application.

In some possible implementations, the code package is the source code package, and the source code package indicates an uncompiled code package.

In some possible implementations, the system 100 further includes:

an analysis subsystem 104, configured to analyze the environment variable to obtain static environment configuration information; and analyze the source code package to obtain container configuration information, where the container configuration information includes blocking information of the source code package, and the blocking information is for dividing the source code package into a plurality of code blocks, where the image management subsystem 108 is configured to obtain the image set of the application based on the static environment configuration information and the container configuration information, where each image in the image set is determined based on the static environment configuration information and at least one of the plurality of code blocks.

In some possible implementations, at least one image in the image set is obtained by searching an image repository based on the static environment configuration information and the blocking information.

In some possible implementations,
the analysis subsystem 104 is configured to analyze the source code package to obtain external component configuration information; and
the system 100 further includes: a container management subsystem 110, configured to obtain an external component based on the external component configuration information, where the external component is associated with the at least one image in the image set, and the remodeling result further includes an association relationship between the external component and the at least one image in the image set.

In some possible implementations, the analysis subsystem 104 is further configured to: obtain runtime code of the application in the runtime environment, and obtain runtime environment configuration information, where the runtime environment configuration information includes a basic associated package associated with the application when the application runs in the runtime environment; and
the image management subsystem 108 is configured to obtain the image set of the application based on the static environment configuration information, the runtime environment configuration information, and the container configuration information, where the at least one image in the image set is determined based on the static environment configuration information, the at least one of the plurality of code blocks, and the basic associated package.

In some possible implementations, the container configuration information further includes a calling relationship between code blocks, and the remodeling result further includes the calling relationship between the code blocks.

The application management system 100 according to this embodiment of this application may correspondingly perform the methods described in embodiments of this application, and the foregoing and other operations and/or functions of subsystems or modules in the subsystems of the application management system 100 are respectively used for implementing corresponding procedures of the methods in the embodiment shown in FIG. 3. For brevity, details are not described herein again.

An embodiment of this application further provides a computing device cluster. The computing device cluster includes at least one computing device. The computing device may be a server, for example, a central server, an edge server, or a local server in a local data center. In some embodiments, the computing device may also be a terminal device such as a desktop computer, a notebook computer, or a smartphone. The computing device cluster is specifically configured to implement a function of the application management system 100 shown in FIG. 1. The following describes a hardware structure of the computing device cluster.

Figure 5:
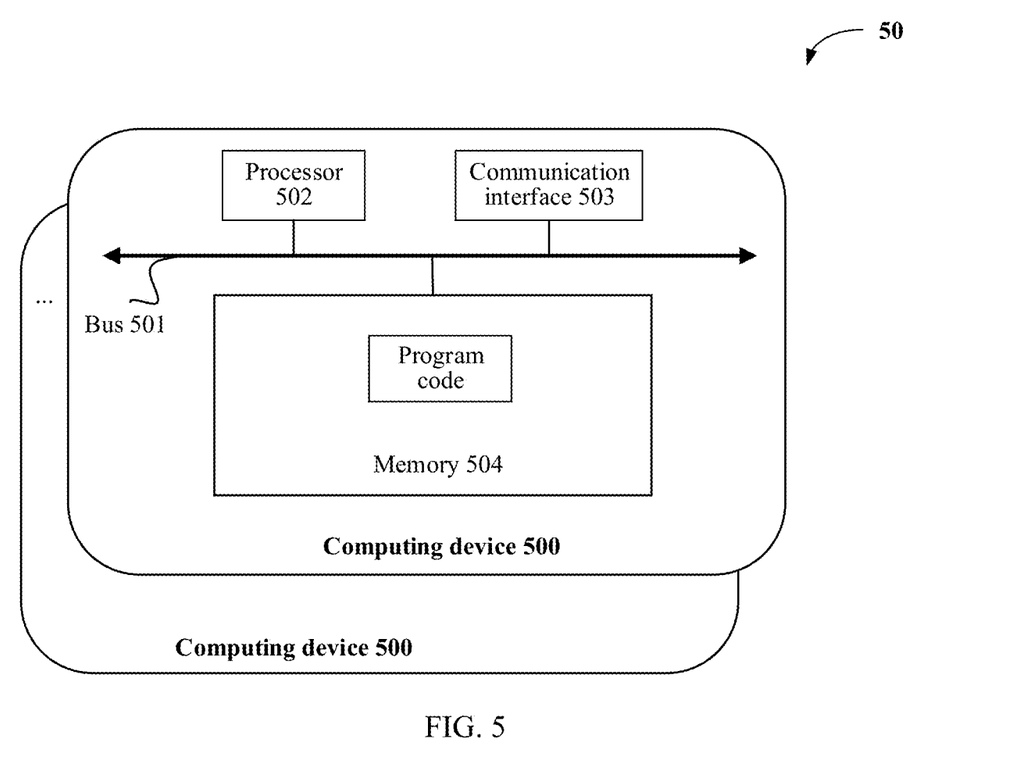
FIG. 5 is a schematic diagram of a structure of a computing device cluster according to an embodiment of this application.

FIG. 5 is a schematic diagram of a structure of a computing device cluster. As shown in FIG. 5, the computing device cluster 50 includes at least one computing device 500, and each computing device 500 includes a bus 501, a processor 502, a communication interface 503, and a memory 504. The processor 502, the memory 504, and the communication interface 503 communicate with each other through the bus 501.

The bus 501 may be a peripheral component interconnect (PCI) bus, an extended industry standard architecture (EISA) bus, or the like. Buses may be classified into an address bus, a data bus, a control bus, and the like. For ease of indication, the bus is indicated by using only one bold line in FIG. 5. However, it does not indicate that there is only one bus or only one type of bus.

The processor 502 may be any one or more of processors such as a central processing unit (CPU), a graphics processing unit (GPU), a microprocessor (MP), or a digital signal processor (DSP).

The communication interface 503 is configured to communicate with the outside. For example, the communication interface 503 may be configured to obtain an environment variable of an application in a runtime environment, a source code package of the application, and the like.

The memory 504 may include a volatile memory, for example, a random access memory (RAM). The memory 504 may alternatively include a non-volatile memory, for example, a read-only memory (ROM), a flash memory, a hard disk drive (HDD), or a solid-state drive (SSD).

The memory 504 stores executable code, and the processor 502 executes the executable code to perform the foregoing application remodeling method.

Embodiments of this application further provide a computer-readable storage medium. The computer-readable storage medium may be any usable medium that can be stored by a computing device, or a data storage device, such as a data center, including one or more usable media. The usable medium may be a magnetic medium (for example, a floppy disk, a hard disk, or a magnetic tape), an optical medium (for example, a DVD), a semiconductor medium (for example, a solid-state drive), or the like. The computer-readable storage medium includes instructions, and the instructions instruct a computing device to perform the foregoing application remodeling method.

Embodiments of this application further provide a computer program product. The computer program product includes one or more computer instructions. When the computer instructions are loaded and executed on a computing device, all or some of the procedures or functions according to embodiments of this application are generated.

The computer instructions may be stored in a computer-readable storage medium or may be transmitted from a computer-readable storage medium to another computer-readable storage medium. For example, the computer instructions may be transmitted from a website, computer, or data center to another web site, computer, or data center in a wired (for example, a coaxial cable, an optical fiber, or a digital subscriber line (DSL)) or wireless (for example, infrared, radio, or microwave) manner.

The computer program product may be a software installation package. When any method of the foregoing application remodeling method needs to be used, the computer program product may be downloaded and executed on a computing device.

Descriptions of procedures or structures corresponding to the foregoing accompanying drawings have respective focuses. For a part that is not described in detail in a procedure or structure, refer to related descriptions of other procedures or structures.

What is claimed is:

1. An application remodeling method performed by a computing device comprising a memory and a processor, the processor being configured to execute instructions stored in the memory, the method comprising:
obtaining an environment variable of an application in a runtime environment and a code package of the application, the environment variable including an operating system type, an operating system version, a kernel version, a basic dependency package of the operating system, or an operating system runtime parameter;

obtaining a remodeling result of the application based on the environment variable and the code package, the remodeling result comprising an image set of the application, the image set comprising a plurality of images; and creating a container based on an image of the image set, the container being configured to execute selected modules of the application.

2. The application remodeling method according to claim 1, wherein the code package is a source code package indicating an uncompiled code package.

3. The application remodeling method according to claim 2, wherein the step of obtaining of the remodeling result of the application comprises:

analyzing the environment variable to obtain static environment configuration information;

analyzing the source code package to obtain container configuration information, wherein the container configuration information comprises blocking information of the source code package, and the blocking information is for dividing the source code package into a plurality of code blocks; and obtaining the image set of the application based on the static environment configuration information and the container configuration information, including determining each image in the image set based on the static environment configuration information and at least one of the plurality of code blocks.

4. The application remodeling method according to claim 3, wherein at least one image in the image set is obtained by searching an image repository based on the static environment configuration information and the blocking information.

5. The application remodeling method according to claim 3, further comprising:

obtaining runtime code of the application in the runtime environment; and obtaining runtime environment configuration information, wherein the runtime environment configuration information comprises a basic associated package associated with the application when the application runs in the runtime environment, wherein the step of obtaining the image set of the application based on the static environment configuration information and the container configuration information comprises:

obtaining the image set of the application based on the static environment configuration information, the runtime environment configuration information, and the container configuration information, including determining the at least one image in the image set based on the static environment configuration information, the at least one of the plurality of code blocks, and the basic associated package.

6. The application remodeling method according to claim 3, wherein the container configuration information further comprises a calling relationship between code blocks, and the remodeling result further comprises the calling relationship between the code blocks.

7. The application remodeling method according to claim 2, further comprising:

analyzing the source code package to obtain external component configuration information; and obtaining an external component based on the external component configuration information, wherein the external component is associated with the at least one image in the image set, and the remodeling result further comprises an association relationship between the external component and the at least one image in the image set.

8. A computing device comprising:

a memory storing executable instructions; and a processor configured to execute the executable instructions to perform operations of:

obtaining an environment variable of an application in a runtime environment and a code package of the application, the environment variable including an operating system type, an operating system version, a kernel version, a basic dependency package of the operating system, or an operating system runtime parameter;

obtaining a remodeling result of the application based on the environment variable and the code package, the remodeling result comprising an image set of the application, the image set comprising a plurality of images; and creating a container based on an image of the image set, the container being configured to execute selected modules of the application.

9. The computing device according to claim 8, wherein the code package is a source code package indicating an uncompiled code package.

10. The computing device according to claim 9, wherein the operation of obtaining the remodeling result of the application comprises:

analyzing the environment variable to obtain static environment configuration information;

analyzing the source code package to obtain container configuration information, wherein the container configuration information comprises blocking information of the source code package, and the blocking information is for dividing the source code package into a plurality of code blocks; and obtaining the image set of the application based on the static environment configuration information and the container configuration information, including determining each image in the image set based on the static environment configuration information and at least one of the plurality of code blocks.

11. The computing device according to claim 10, wherein at least one image in the image set is obtained by searching an image repository based on the static environment configuration information and the blocking information.

12. The computing device according to claim 10, wherein the processor of the computing device is further configured to perform operations of:

obtaining runtime code of the application in the runtime environment; and obtaining runtime environment configuration information, wherein the runtime environment configuration information comprises a basic associated package associated with the application when the application runs in the runtime environment, wherein the operation of obtaining the image set of the application based on the static environment configuration information and the container configuration information comprises:

obtaining the image set of the application based on the static environment configuration information, the runtime environment configuration information, and the container configuration information, including determining the at least one image in the image set based on the static environment configuration information, the at least one of the plurality of code blocks, and the basic associated package.

13. The computing device according to claim 9, wherein the processor of the computing device is further configured to perform operations of:
analyzing the source code package to obtain external component configuration information; and
obtaining an external component based on the external component configuration information, wherein the external component is associated with the at least one image in the image set, and the remodeling result further comprises an association relationship between the external component and the at least one image in the image set.

14. A non-transitory computer readable storage medium having instructions stored thereon that, when executed by a processor, cause an apparatus to:
obtain an environment variable of an application in a runtime environment and a code package of the application, the environment variable including an operating system type, an operating system version, a kernel version, a basic dependency package of the operating system, or an operating system runtime parameter;
obtain a remodeling result of the application based on the environment variable and the code package, the remodeling result comprising an image set of the application, the image set comprising a plurality of images; and
create a container based on an image of the image set, the container being configured to execute selected modules of the application.

15. The non-transitory computer readable storage medium according to claim 14, wherein the code package is a source code package indicating an uncompiled code package.

16. The non-transitory computer readable storage medium according to claim 15, wherein the apparatus is caused to obtain the remodeling result of the application comprises:
analyze the environment variable to obtain static environment configuration information;
analyze the source code package to obtain container configuration information, wherein the container configuration information comprises blocking information of the source code package, and the blocking information is for dividing the source code package into a plurality of code blocks; and
obtain the image set of the application based on the static environment configuration information and the container configuration information, including determining each image in the image set based on the static environment configuration information and at least one of the plurality of code blocks.

17. The non-transitory computer readable storage medium according to claim 16, wherein at least one image in the image set is obtained by searching an image repository based on the static environment configuration information and the blocking information.

18. The non-transitory computer readable storage medium according to claim 16, wherein the apparatus is further caused to:
obtain runtime code of the application in the runtime environment; and
obtain runtime environment configuration information, wherein the runtime environment configuration information comprises a basic associated package associated with the application when the application runs in the runtime environment,
wherein the apparatus is caused to obtain the image set of the application based on the static environment configuration information and the container configuration information comprises:
obtain the image set of the application based on the static environment configuration information, the runtime environment configuration information, and the container configuration information, including determining the at least one image in the image set based on the static environment configuration information, the at least one of the plurality of code blocks, and the basic associated package.

19. The non-transitory computer readable storage medium according to claim 16, wherein the container configuration information further comprises a calling relationship between code blocks, and the remodeling result further comprises the calling relationship between the code blocks.

20. The non-transitory computer readable storage medium according to claim 15, wherein the apparatus is further caused to:
analyze the source code package to obtain external component configuration information; and
obtain an external component based on the external component configuration information, wherein the external component is associated with the at least one image in the image set, and the remodeling result further comprises an association relationship between the external component and the at least one image in the image set.

\* \* \* \* \*